Nov. 15, 1949     G. C. PETERSON     2,487,941
NONVACUUM CYLINDER HOUSING FOR COMBINES

Filed Aug. 2, 1945     2 Sheets-Sheet 1

INVENTOR.
Glen C. Peterson,
BY Victor J. Evans & Co.
ATTORNEYS

Nov. 15, 1949     G. C. PETERSON     2,487,941
NONVACUUM CYLINDER HOUSING FOR COMBINES
Filed Aug. 2, 1945     2 Sheets-Sheet 2
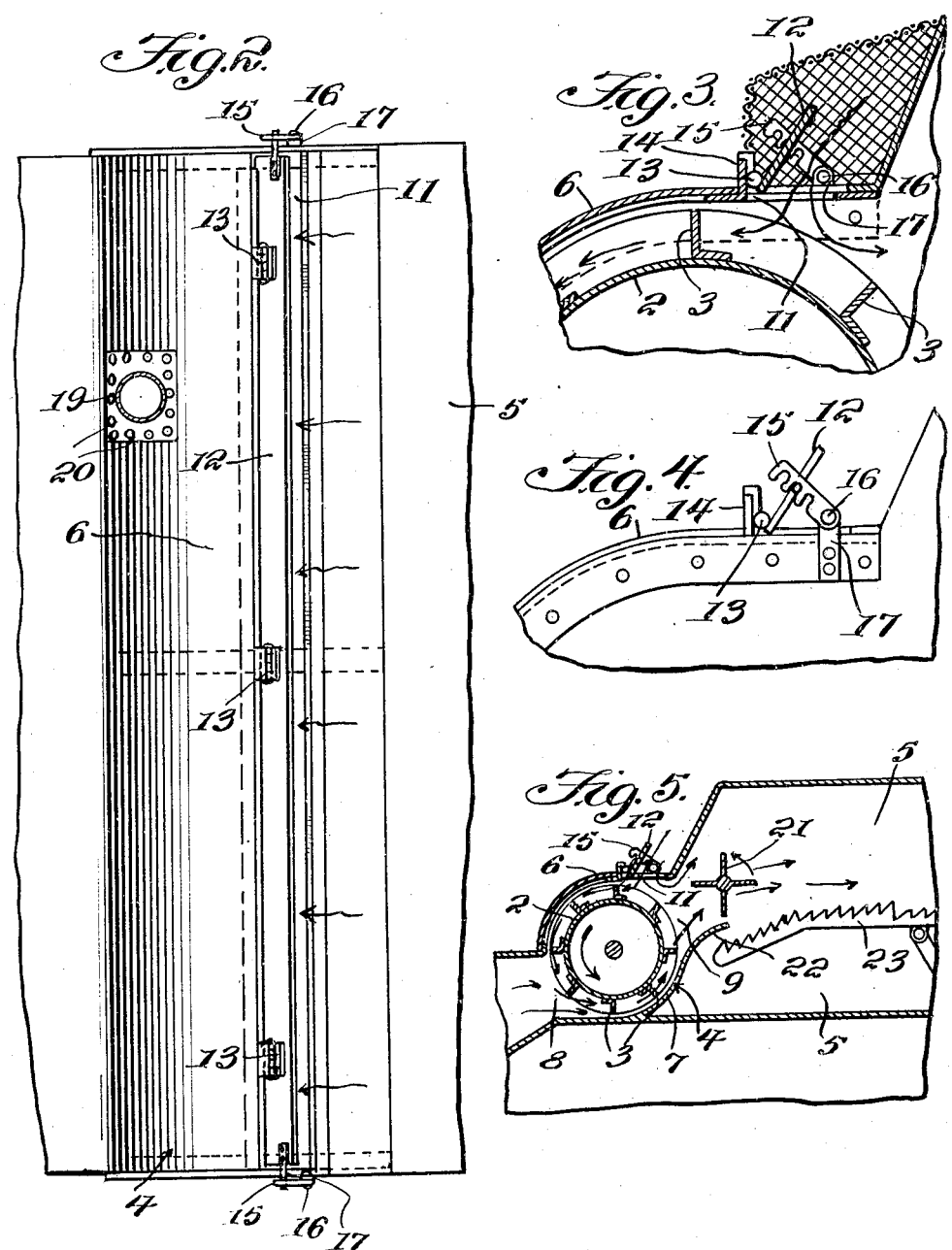
INVENTOR.
Glen C. Peterson,
BY Victor J. Evans & Co.
ATTORNEYS Patented Nov. 15, 1949

2,487,941

UNITED STATES PATENT OFFICE 2,487,941

NONVACUUM CYLINDER HOUSING FOR COMBINES

Glenn C. Peterson, Mokena, Ill.

Application August 2, 1945, Serial No. 608,508

1 Claim. (Cl. 130—27)

My present invention, in its broad aspect, has to do with improvements in means for prevention of eddy currents, partial vacuums, and other disturbances in the proper and free flow of air through the rotary cylinder and between the cylinder and housing therefor in harvesting machinery of the type known as combines, wherein the unthrashed grain and straw is usually delivered on an endless conveyor to the rotary cylinder and housing where it is taken up by the tremendous current or blast of air created by the high rotation of the cylinder and blades and carried in the blast and delivered to the separator housing, wherein the grain is bully thrashed and separated from the straw and chaff. I have found difficulty due to the creation of a partial vacuum and eddy currents and some reverse current above the blast of air through the cylinder and the housing. This not only detracts from the efficiency of the operation generally, but has a tendency to carry back straw and the like which in time clogs and chokes the cylinder. My present invention is designed to relieve these disadvantages and adds others and to accomplish these and other results modifications in ordinary combine structure are relatively slight and simple.

Other and equally important objects and advantages of my invention will be apparent from the following description and drawings, and it is pointed out that changes in form, size, shape, materials and construction and arrangement of parts are permissible and within the purview of my broad inventive concept, and the scope of the appended claim.

In the drawings, wherein I have illustrated a preferred form of my invention:

Figure 2 is a top plan view of my invention with the screen removed;

Figure 3 is a vertical section through my opening, adjustable door and screen;

Figure 4 is a side view with the screen removed, and

Figure 5 is a modified form showing the operation of my door in increasing the efficiency of the blast, and the use of a supplementary fan blower.

In the drawings, wherein like characters of reference are used to designate like or similar parts:

Figure 1:
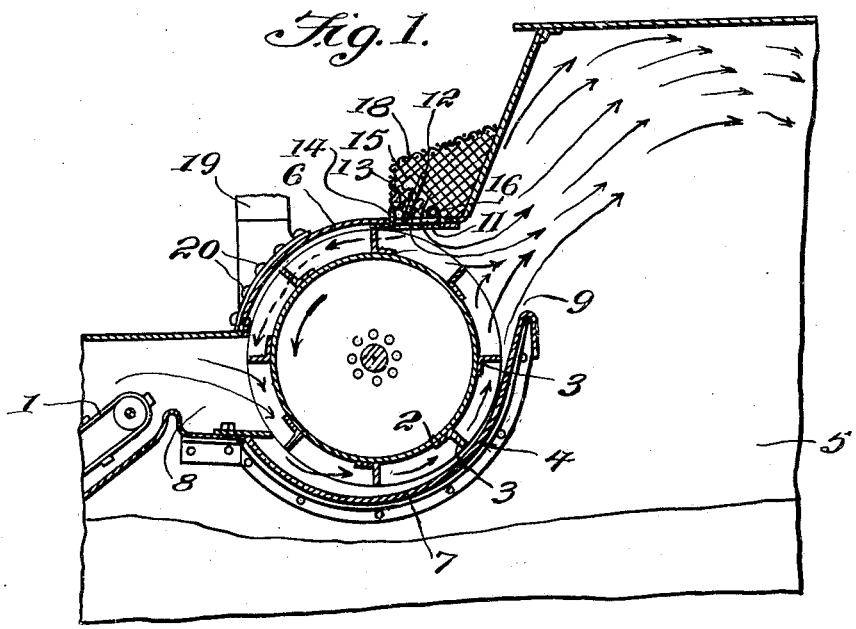
Figure 1 is a sectional side elevation.

The numeral 1 designates the endless conveyor of unthrashed grain which operates upwardly at an incline in the harvester and delivers the unthrashed grain, straw, chaff and the like to the rotary cylinder 2. The cylinder has the usual blades 3 and revolves at a high rate of speed creating a draft or blast of air between the cylinder and housing 4 in the direction of the arrows and picks up the material from the conveyor 1 and delivers it to the separator 5 where the wheat is separated from the straw and chaff.

Referring now to Figure 1, I have found that providing in the arcuate top part 6 an elongated slot or opening 11, just back of the axis of the cylinder, not only are these conditions eliminated, but a clear current of air is picked up by the cylinder and fed around the cylinder in the right direction and supplements to blast of air created by the cylinder, as shown in Figure 1, and also permits entrance of air directly into the separator housing in the direction of the blast. No partial vacuum or eddy currents are created and the efficiency of my device is greatly increased.

Above the slot or opening 11, I provide an adjustable hinged door 12, which functions primarily in the cylinder as a deflector and opens in the direction of the separator. The door 12 is hinged at 13 to a short vertical support 14, and a notched arm 15 pivoted at 16 in a strap 17 engages the same to hold it at the proper angle—see Figures 3 and 4. An enclosing screen housing 18 is mounted between the vertical support 14 and separator housing to prevent entrance of debris and the like, and the top of the housing 4 is connected to the tailings return chute 19, shown in Figure 2 by means of fasteners 20.

In the modification shown in Figure 5, I have shown a small blower fan 21 back of the cylinder further directing the path of the blast or draft into the separator, and operating above a curved lip 22 and separator floor 23.

From the foregoing, it is believed that the operation and advantages of my invention will be apparent, but it is again emphasized that interpretation of its scope should only be conclusive when made in the light of the subjoined claim.

I claim:

The combination in a combine having a rotary cylinder in a housing and receiving grain to be thrashed and picking the same up in a blast of air and delivering it to a separator, an adjustable door for the cylinder having an elongated slot in the housing just back of and above the axis of the cylinder, and the adjustable door opens toward the separator for admitting air above the cylinder to prevent back currents from the separator and prevent creation of partial vacuums in the blower draft or blast to the separator, and a screen over and arranged to enclose the slot and adjustable door a short vertical support on said housing at said slot to which said door is hinged, and a notched arm is pivoted on said casing at said slot to engage said door to retain said door in various angular adjusted positions above the slot.

GLENN C. PETERSON.

REFERENCES CITED

The following references are of record in the file of this patent:

UNITED STATES PATENTS

| Number | Name | Date |
|---|---|---|
| 10,724 | Barber | May 18, 1886 |
| 385,590 | Broska | July 3, 1888 |
| 555,533 | Randolph | Mar. 3, 1896 |
| 668,041 | Flagg | Feb. 12, 1901 |
| 959,445 | Bartholomew | May 31, 1910 |
| 1,256,506 | Norris | Feb. 12, 1918 |

FOREIGN PATENTS

| Number | Country | Date |
|---|---|---|
| 9,437 of 1932 | Australia | Sept. 29, 1932 |
| 79,129 | Sweden | Feb. 19, 1932 |
| 116,171 | Australia | Dec. 13, 1941 |